No. 897,709. PATENTED SEPT. 1, 1908.
G. W. BOLL.
STORAGE BIN.
APPLICATION FILED JAN. 6, 1908.

3 SHEETS—SHEET 1.

Witnesses
R. C. Laflin
F. J. Veihmeyer

Inventor
George W. Boll
By Edson Bros
Attorneys

No. 897,709. PATENTED SEPT. 1, 1908.
G. W. BOLL.
STORAGE BIN.
APPLICATION FILED JAN. 6, 1908.

3 SHEETS—SHEET 2.

Witnesses
R. C. Claflin
F. J. Veihmeyer

Inventor.
George W. Boll
By Edson Pvt
Attorney

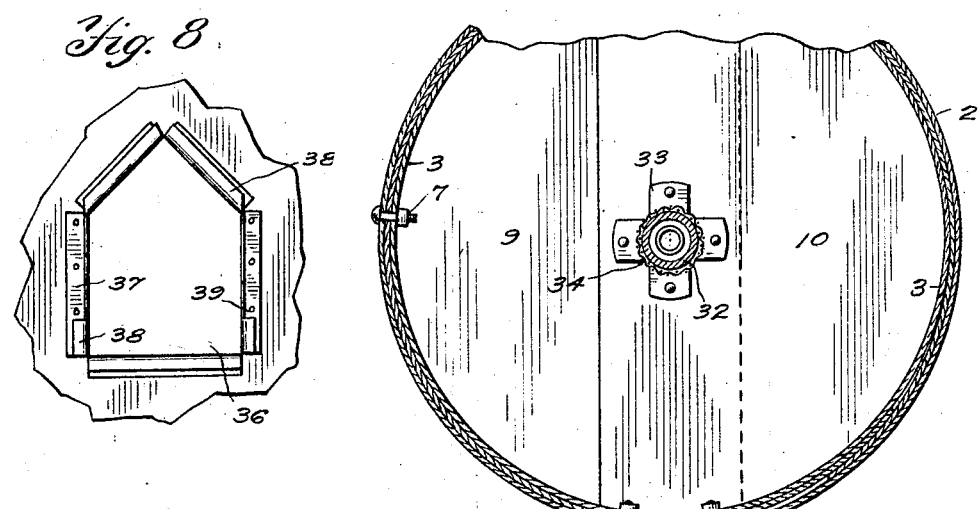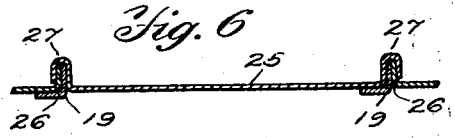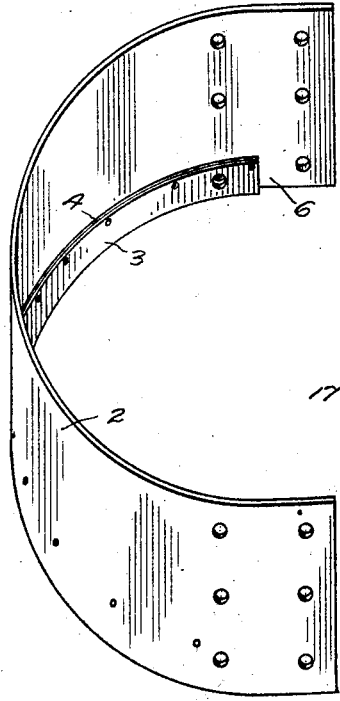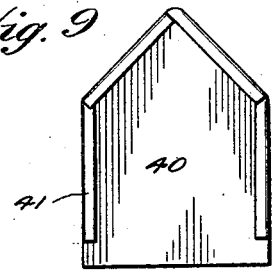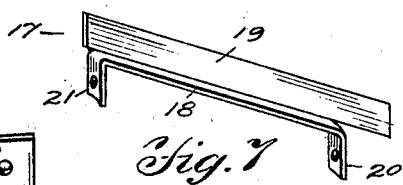

UNITED STATES PATENT OFFICE.

GEORGE W. BOLL, OF MOUNT HOPE, KANSAS.

STORAGE-BIN.

No. 897,709. Specification of Letters Patent. Patented Sept. 1, 1908.

Application filed January 6, 1908. Serial No. 409,554.

*To all whom it may concern:*

Be it known that I, GEORGE W. BOLL, a citizen of the United States, residing at Mount Hope, in the county of Sedgwick and State of Kansas, have invented certain new and useful Improvements in Storage-Bins; and I do hereby declare the following to be a full, clear, and exact description of the invention, such as will enable others skilled in the art to which it appertains to make and use the same.

My invention relates to improvements in storage receptacles and particularly to that class of storage bins known as granaries.

It has for its special object to provide a granary or bin of simple and improved construction, which may be quickly dismantled, packed in a comparatively limited space and shipped to any desirable place where the component parts may be subsequently readily assembled.

Another object of my invention is to provide a granary or bin of the "knock down" type which shall be constructed of a plurality of interlocking sections, said sections themselves being capable of further subdivision to economize space in shipping.

Another object of my invention is to provide a bin the volume of which may be varied at will as it is subjected to different conditions.

A further object is to construct a bin of the class described which will be impervious to fire, weather, vermin and all insects.

The invention consists of the features of construction and combinations of devices hereinafter described and specified in the claims.

Figure 1:
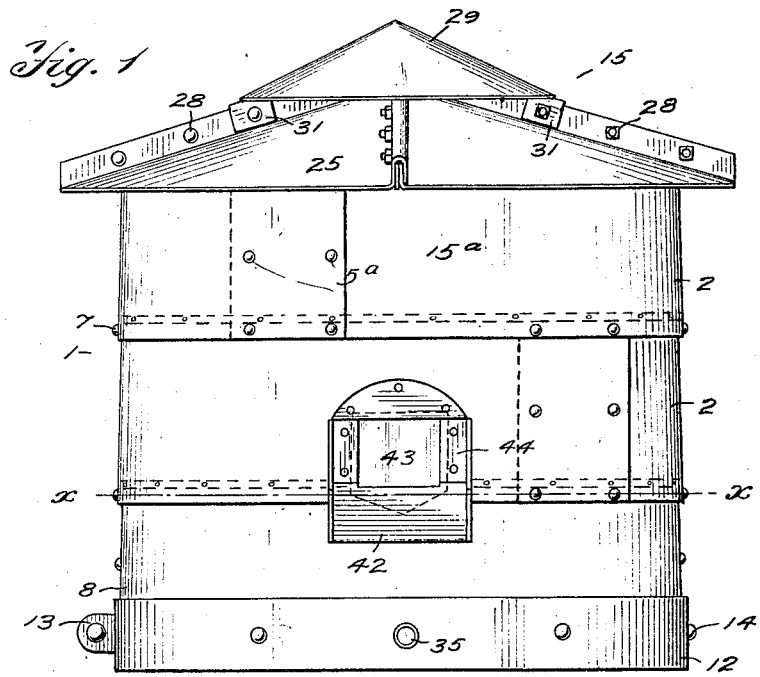
Figure 2:
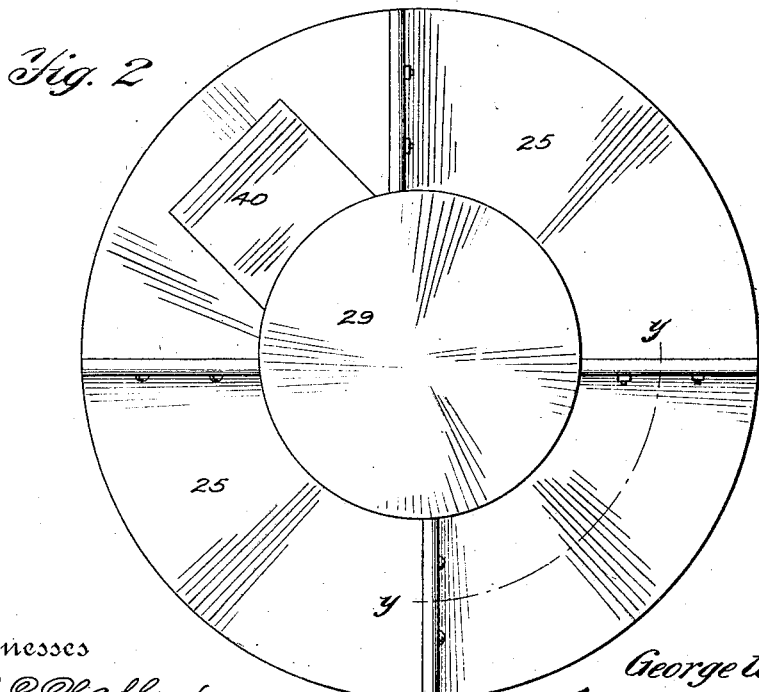
Figure 3:
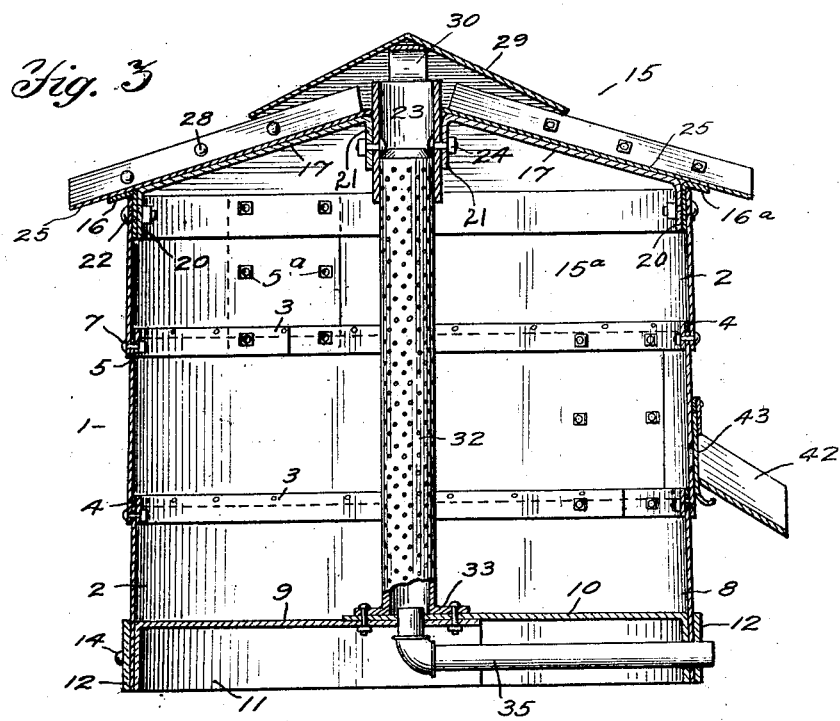
Figure 5:
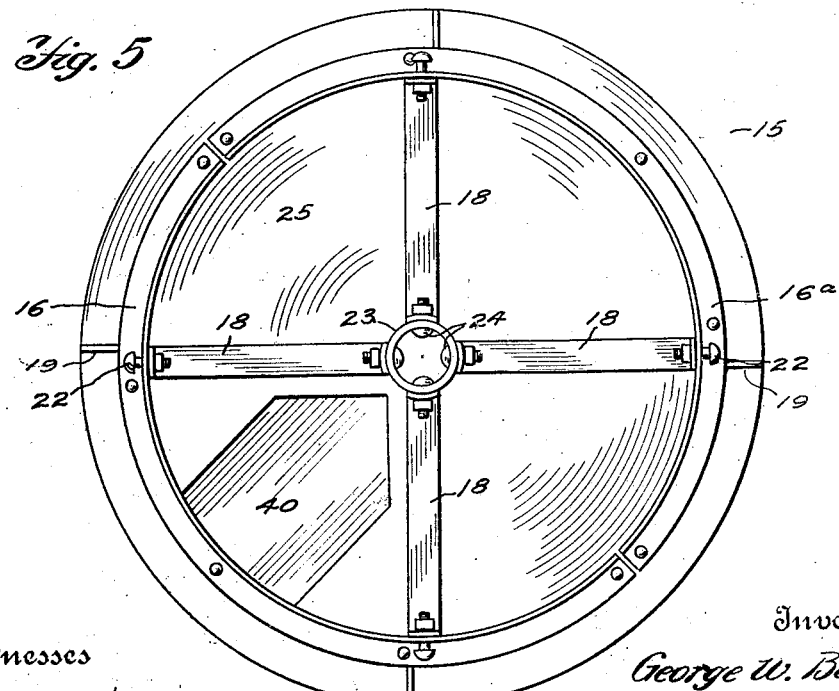

In the accompanying drawings which illustrate the preferred embodiment of my invention: Figure 1 is a side elevation of a bin constructed in accordance with the invention. Fig. 2 is a plan view thereof. Fig. 3 is a central vertical sectional view thereof. Fig. 4 is a sectional view on line x—x of Fig. 1. Fig. 5 is an underplan view of the roof. Fig. 6 is a sectional view on line y—y of Fig. 2. Fig. 7 is a detailed view of one of the roof beams. Fig. 8 is a broken plan view of the hatch way in the roof. Fig. 9 is an under plan view of the hatch, and Fig. 10 is a detailed perspective view of one of the plates which make up the sections.

Referring more particularly to the drawings, 1 designates the body of the bin, the wall of which is preferably of circular or cylindrical form, and is composed of a number of superposed circular sections, the number and diameter of said sections being governed by the desired capacity of the completed bin. Each section is made up of a plurality of sheet-metal plates 2, bent to conform to the desired shape of the complete structure. Annular strips 3 are permanently riveted to the inner bottom edges of the plates 2, spacing strips 4 being interposed between the strips 3 and the faces of said plates. The spacing strips 4 are the same thickness as the plates 2, so that the resulting spaces 5 between said strips and plates are adapted to receive the top edges of the plates of the next lower section. The strips 3 do not extend to the ends of their respective plates, sufficient room being left to allow the adjacent ends of said plates to overlap, as at 6, while the ends of said strips meet one another. The overlapping ends of the plates of the same section are detachably but securely connected by means of bolts 5ª passed through registering apertures in said overlapping ends. The upper edges of the sections are crimped or tapered slightly so that when the sections are superposed upon one another, the exterior wall of the bin will be substantially perpendicular. The upper edge of each section fits into the space 5 of the next higher section. Bolts 7 are passed through registering openings in the two sections and the annular strips 3 whereby said sections are detachably connected, certain of said bolts 7 also serving, in addition to the bolts 5ª, to secure together the ends of the plates composing the upper section.

The base or bottom section 8 of the bin is composed of a wall comprising a plurality of plates of similar construction and connected in a similar manner as those comprising the intermediate sections. The bottom proper of this base section is preferably made of heavier material than the other parts of the bin and consists of two segmental disks 9 and 10 having annular flanges 11 on their peripheries. A reinforcing strip or band 12 is arranged around the bottom of the base section and is provided with lugs or offsets 13 to receive a bolt by means of which the said bottom sections are clamped firmly together. The flanges of the segmental disks, the vertical plates and the band 12 are detachably fastened together by bolts 14 passed through suitable apertures in the different parts. The disks 9 and 10 overlap along their adjacent edges and are also bolted together.

The roof section 15 is composed of a plurality of plates $15^a$ of similar construction as the plates of the other sections. Two semicircular angle-irons 16 and $16^a$ are fastened to the inner side of the upper edges of the plates $15^a$. The roof beams or rafters 17 have lateral base flanges 18, perpendicular flanges 19 and depending lugs 20 and 21. The angles formed between the lugs 20 and 21 and the base flanges 18 are respectively obtuse and acute in order to give the proper pitch to the roof when in position. The angle-irons 16 and $16^a$, the plates $15^a$ and the lugs 20 of the beams 17, are fastened together by bolts 22. The beams 17 terminate at a centrally arranged pipe 23 to which they are secured by the lugs 21 and bolts 24. The roof comprises plates 25 of sheet metal, every alternate plate having perpendicular flanges 26 and the others inverted U-shaped flanges 27. The sections having the perpendicular flanges 26 are placed between the beams 17, one edge of each plate resting on a base flange 18 of one of said beams, and the perpendicular flanges 26 of said plates registering with the flanges 19 of the beams. The plates carrying the inverted U-shaped flanges 27 are then positioned, the flanges 27 extending over the flanges 19 and 26 forming water tight joints and secured by bolts 28 passed therethrough. The inner ends of the roof plates are cut away to allow them to fit the outer surface of the pipe 23. A conical cap piece 29 to shield the opening of the pipe 23 is arranged on the apex of the roof. It is supported by arms 30 having clips 31 passed over opposite flanges of the roof plates and fastened by bolts passed through said clips and flanges.

A perforated ventilating tube 32 is centrally arranged in the bin, its upper end extending into the pipe 23 in the roof. Said ventilator tube is provided with lateral lugs 33 by means of which it is attached to the bottom of the bin. The tube is incased in a fine mesh wire screen 34 to prevent the grain from entering the tube by means of the perforations therein. A pipe 35 secured to the underside of the base of the bin communicates with an opening therein, arranged under the tube 32 and with the outside air. This insures perfect circulation of the air through the bin and prevents the grain stored therein from molding.

To fill the bin I provide a hatchway 36 in one of the roof sections, the upper end of which is preferably pointed. Around the sides and ends of said hatchway are fastened angle irons 37 having lateral flanges 38. The upper part of the lateral flanges on the sides of the hatchway are cut away at 39. When it is desired to remove the hatch 40, which has flanges 41 corresponding to and adapted to engage the flanges 38, it is only necessary to move it upwardly until the flanges 41 clear the flanges 38 on the sides of the opening when the hatch can be raised. It will be noted that the upper pointed ends of the hatch and hatch-way are protected from rain by the overhanging conical cap piece 29. The bin may be filled by means of the hatchway or a whole roof plate may be readily removed after taking out the bolts 28. A delivery chute 42 and cut off gate 43 may be arranged on one of the sections, as shown. Said cut off gate is supported in guide ways 44 arranged between the end of the chute and the surface of the section in which the cut off gate is arranged.

While in the drawings I have shown each section of the bin composed of only two vertical plates, it will be understood that a plurality of such plates may be employed in making up the sections, the number used being determined by the size of bin required and convenience in handling the parts.

While the construction of the joints as shown give ample protection from the elements, rats and other vermin, I may also use rubber or leather packing between said joints, if found desirable.

From the above description it is evident that by means of the construction devised a bin of any desired capacity may be quickly constructed by assembling the matched parts and that said parts may be conveniently packed for transportation.

An examination of the arrangement of the overlapping bin sections, the interlocking flanges of the roof plates, the flanges of the hatch and hatchway, the guide ways of the cut off gate for the delivery chute, and the shape and manner of connection of the cap piece, shows that all the exterior joints are turned downward, thereby excluding the possibility of moisture penetrating between the parts.

No claims are made herein to the roof construction as this forms the subject matter of a divisional application.

I claim:

1. A storage bin comprising a plurality of superposed horizontal sections which overlap one another, one section having a strip secured to its lower edge, a spacing strip arranged between said first mentioned strip and said section whereby a groove is formed to receive the upper edge of the next section below, and means to detachably secure said edge in said groove.

2. A storage bin comprising a plurality of horizontal sections each made up of a plurality of vertical plates, each of the plates of one section having a strip secured near one edge, spacing strips interposed between said first mentioned strips and plates forming grooves to receive the adjacent edge of the next section, said first mentioned strips terminating inwardly of the ends of the plates to which they are secured, whereby the ends of said plates may be overlapped for the purpose of securing them to one another while the ends of said strips abut against one another.

3. A storage bin comprising a plurality of horizontal sections each made up of a plurality of vertical plates, each of the plates of one section having a strip secured near one edge, spacing strips interposed between said first mentioned strips and plates forming grooves to receive the adjacent edge of the next section, said first mentioned strips terminating inwardly of the ends of the plates to which they are secured, whereby the ends of said plates may be overlapped for the purpose of securing them to one another while the ends of said strips abut against one another, said spacing strips extending throughout the lengths of the other strips.

4. A storage bin comprising a plurality of horizontal sections each made up of a plurality of vertical plates, each of the plates of one section having a strip secured near one edge, spacing strips interposed between said first mentioned strips and plates forming grooves to receive the adjacent edge of the next section, said first mentioned strips terminating inwardly of the ends of the plates to which they are secured, whereby the ends of said plates may be overlapped for the purpose of securing them to one another while the ends of said strips abut against one another and bolts passed through said overlapping ends of said plates, the ends of the strips and the edge of the section which engages the groove formed by said strips whereby said plates and sections are detachably connected.

5. In a storage bin, a base section consisting of a plurality of overlapping plates detachably connected together at their overlapping ends, over-lapping segmental disks forming the bottom of the bin, detachably connected together and to said plates, and a reinforcing band encircling the bottom of said base section.

In testimony whereof, I affix my signature, in presence of two witnesses.

GEORGE W. BOLL.

Witnesses:
C. C. CARSON,
HENRY JORGENSEN.